UNITED STATES PATENT OFFICE.

HOWARD W. BROWN, OF OAKLAND, CALIFORNIA.

COPYING-SHEET.

SPECIFICATION forming part of Reissued Letters Patent No. 11,113, dated September 30, 1890.

Original No. 409,826, dated August 27, 1889. Application for reissue filed November 27, 1889. Serial No. 331,819.

*To all whom it may concern:*

Be it known that I, HOWARD W. BROWN, a citizen of the United States, residing in Oakland, in the county of Alameda and State of California, have invented a new and useful Portable Copying-Sheet, of which the following is a full, clear, and exact specification.

My invention relates to improvements in copying-sheets for letters, circulars, and other written matter. I generally employ paper of about the thickness and quality of light commercial note-paper for my sheet; but it is obvious that any other kind may be used with equally good result, or, if desired, the backing may be of any suitable material. I prepare the surface of the backing with a thin coat of copying compound, which is smoothly laid on about the thickness of an ordinary coat of varnish or paint. The compound composing my copying material consists of the following ingredients, mixed in about the proportion set forth: To three pounds of glycerine, one pound of gelatine, one pound of water, three ounces of glue, four ounces of alum, which I combine and dissolve by placing in a vessel over steam heat and stirring carefully until a perfect mixture is formed. This compound I spread upon the surface of the backing evenly in a thin coat. Then, in order to protect this coating and to maintain it in a permanently-moist condition, I perfect the coating by sifting over its surface a finely-pulverized compound consisting of lycopodium and alum, mixed in about the proportion of one-fourth an ounce of alum to two ounces of lycopodium.

This compound is gradually incorporated with the copying-surface of the sheet, and produces a soft, velvety surface, which remains in a dry and still very yielding and elastic state. By thus protecting the surface of the copying compound I am enabled to place two sheets together without liability of the same sticking together, even in the hottest weather or climate, thus forming a coating which shall be impervious to the moisture of the sheet, but which at the same time will keep the copying compound in a permanently-moist condition.

When the sheet is about to be used for copying purposes, the outer velvety surface or coating is removed by being washed off with a soft wet sponge, and as soon as dry the surface is ready for the letter or other matter to be copied to be applied thereto. By the use of good aniline ink a hundred or more copies may be made clear and distinct from a single sheet. The sheets thus prepared are generally secured together in the form of a tablet or book, so as to enable each sheet after once having been used to be torn off in the same manner as a sheet from a pad and thrown away. If so desired, however, the same may be supplied in the form of a roll to be unrolled when required for use. When the sheet has been prepared as stated, the surface will remain perfectly good for many months without being liable to granulate or crack, and at the same time insures portability.

I have discovered that when French chalk is used its effect upon the compound is only temporary, as it absorbs all the moisture therefrom, and a chemical change takes place in which the sheet becomes hard, dry, and granulated, causing it to rapidly deteriorate, and in a short time it becomes totally unfit for use. I have found that a composition or powder produced from a combined mixture of pulverized alum and lycopodium is about the best and only coating which appears to fully answer the necessary requirements. The lycopodium enters the composition and, filling the pores, hermetically seals the surface, which entirely prevents the evaporation of moisture, thereby maintaining the copying-surface in a continuous moist condition, which is of the utmost importance in a sheet of this nature, inasmuch as should the same become dry it would be useless for copying purpose. Again, the lycopodium produces a soft, velvety-like, smooth surface, prevents the sticking together of the sheets when placed face to face, and acts as a preservative, while the alum acts as an astringent and serves the purpose of toughening and hardening the surface, causing the same to become firm and compact.

I am aware that a departure may be made in the mixing of the compound herein described without departing from the nature of the invention.

Having thus fully described the nature of my invention, what I claim as new, and desire to secure protection in my Letters Patent of the United States, is—

As a new article of manufacture, a copying sheet or pad consisting of a suitable backing provided with a glutinous coating, having a covering or protecting surface composed of alum and lycopodium and adapted to serve as a hermetical seal, so as to retain the copying material or coating in a non-adhesive and permanently-moist condition, substantially as set forth.

In witness whereof I have hereunto affixed my signature in the presence of witnesses.

HOWARD W. BROWN.

In presence of—

JAMES MASON,

F. D. CLAYTON.